United States Patent
Osieka et al.

[15] 3,652,255

[45] Mar. 28, 1972

[54] AGENTS FOR RETARDING THE GROWTH OF PLANTS AND CHANGING THEIR HABIT

[72] Inventors: Hans Osieka; Karl-Heinz Koenig, both of Ludwigshafen (Rhine); Johann Jung, Limburgerhof, Pfalz; Harry Distler, Ludwigshafen (Rhine), all of Germany

[73] Assignee: Badische Anilin-& Soda-Fabrik Aktiengesellschaft, Ludwigshafen (Rhine), Germany

[22] Filed: Sept. 3, 1969

[21] Appl. No.: 870,952

Related U.S. Application Data

[62] Division of Ser. No. 641,163, May 25, 1967, abandoned.

[30] Foreign Application Priority Data

June 1, 1966    Germany...................P 15 42 826.9

[52] U.S. Cl....................................................71/76, 71/98
[51] Int. Cl. .................................................................A01n
[58] Field of Search...............................................71/98, 76

[56] References Cited

UNITED STATES PATENTS

| | | | |
|---|---|---|---|
| 3,101,265 | 8/1963 | Smutny et al. | 71/98 X |
| 3,159,682 | 12/1964 | Baird et al. | 260/607 |
| 3,187,008 | 6/1965 | Baird et al. | 260/327 |
| 3,235,356 | 2/1966 | Herschler | 71/98 X |

*Primary Examiner*—James O. Thomas, Jr.
*Attorney*—Johnston, Root, O'Keeffe, Keil, Thompson & Shurtleff

[57] ABSTRACT

Sulfonium salts and a method of retarding plant growth with said sulfonium salts.

5 Claims, No Drawings

AGENTS FOR RETARDING THE GROWTH OF PLANTS AND CHANGING THEIR HABIT

This application is a division of our copending application Ser. No. 641,163, filed May 25, 1967 now abandoned.

The present invention relates to sulfonium salts, in particular trialkylsulfonium salts whose alkyl radicals may be substituted, and to a method of retarding plant growth with said compounds.

It is known that trimethylammonium-β-chloroethyl chloride chlorocholine chloride (CCC) may be used for reducing the growth height of plants. The stalk length of wheat for example may be reduced with this active ingredient and lodging prevented. However the results obtainable with this substance are not satisfactory.

One object of the invention is to provide new sulfonium salts. Another object of the invention is to provide trialkylsulfonium salts whose alkyl radicals may bear substituents. A further object of the invention is to provide sulfonium salts which regulate the growth of plants, i.e. alter the development of plants in such a way that the plants do not grow as high as untreated plants and are not injured.

These and other objects of the invention are achieved with sulfonium salts having the formula

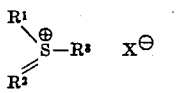

in which $R^1$ denotes a linear or branched aliphatic radical with one to four carbon atoms, $R^2$ denotes a linear or branched alkyl radical with one to four carbon atoms which may be substituted by a hydroxy group or a linear or branched alkenyl radical with three to four carbon atoms, $R^3$ denotes a halomethyl radical or a tertiary butyl radical or a linear or branched alkynyl radical with three to four carbon atoms or a radical having the formula $$-\underset{\underset{R^4}{|}}{C}H-\underset{\underset{R^5}{|}}{C}H-R^6,$$

in which $R^4$ and $R^5$ denote hydrogen or a lower alkyl group or a phenyl, cyano, carboxy or lower carbalkoxy group and $R^6$ denotes hydrogen, a methyl radical, chlorine, bromine, hydroxy, chloromethyl, bromomethyl or hydroxymethyl or a radical having the formula

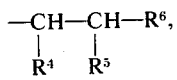

in which $R^7$ denotes a methyl group or hydrogen or chlorine, $R^8$ and $R^9$ denote hydrogen or chlorine and X denotes an anion. The plants exhibit sturdier growth and the color of the foliage is darker.

Since the biological action of the sulfonium compounds may be determined by the cation, X may denote any anion: chlorides, bromides, iodides, hydroxides, methosulfates, ethyl sulfates, hydrogen sulfates and p-tolyl sulfonates are preferred.

In accordance with their character as salts most of the active ingredients are water-soluble substances, some of which are crystalline and some of which are oily.

The active ingredients may for example be easily prepared by alkylating thioethers according to the following equation:

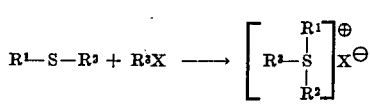

$R^1$, $R^2$ and $R^3$ having the meanings given above.

Sulfides in a solvent (e.g., acetone, alcohol, benzene, acetonitrile, ether, nitromethane or water), or without a solvent, are reacted with an alkylating agent, e.g. methyl iodide, methyl bromide, dimethyl sulfate, diethyl sulfate or sulfonic acid esters, at atmospheric or elevated pressure and at a temperature of from −10° to +150° C., preferably from 0° to 100° C. with or without a catalyst. Epoxides also react readily with sulfides in the presence of a mineral acid. Further possibilities of preparing the sulfonium compounds are for example the disproportionation of thioethers or the alkylation of disulfides and oligosulfides.

The preparation of some of the compounds of this invention will now be described briefly.

1. β-Chloroethyldimethylsulfonium iodide (I)

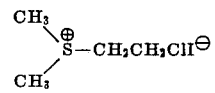

11 parts (by weight) of β-chloroethylmethyl sulfide dissolved in acetone is mixed with 14.2 parts of methyl iodide. After being allowed to stand for one day at room temperature the precipitated crystals are suction filtered, the mother liquor is evaporated in vacuo to half its volume and further amounts of compound I are precipitated with ether. The crude substance which melts at about 80° C. and is obtained in an almost quantitative yield is recrystallized from acetone or a mixture of methanol and ether and is in the form of white needles; m.p. = 89° to 91° C.

| Analysis | C | H | S | I |
|---|---|---|---|---|
| Calc. | 19.02 | 3.99 | 12.7 | 50.24 |
| Found | 19.5 | 4.0 | 12.4 | 50.6 |

2. β-Hydroxyethyldimethylsulfonium iodide (II)

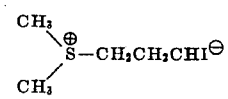

9.2 parts (by weight) of β-hydroxyethylmethyl sulfide and 14.2 parts of methyl iodide are dissolved in acetone and allowed to stand for 1 to 2 days at room temperature; the precipitated crystals are suction filtered and further amounts of the compound are precipitated from the mother liquor. The crude compound obtained melts at 49° C.: pure white crystals with a melting point of 54° to 55° C. are obtained by recrystallization from acetone or a mixture of methanol and ether. The yield is 90 percent of the theory.

| Analysis | C | H | S | I |
|---|---|---|---|---|
| Calc. | 20.52 | 4.74 | 13.7 | 54.21 |
| Found | 20.6 | 4.8 | 13.7 | 54.3 |

3. β-Chloroethylethylmethylsulfonium iodide (III)

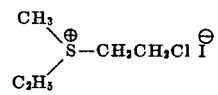

may be obtained in the same way as compounds I and II by alkylating ethyl-β-chloroethyl sulfide with methyl iodide. Its melting point is 92° to 93° C. (recrystallized from a mixture of acetone and ether).

| Analysis | C | H |
|---|---|---|
| Calc. | 22.53 | 4.53 |
| Found | 22.6 | 4.6 |

4. β-Hydroxyethyl-n-butylmethylsulfonium iodide (IV)

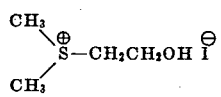

may be obtained by allowing for example butylmethyl sulfide, ethylene oxide and hydrogen iodide to stand for 2 days at 0° to 5° C. or butyl-β-hydroxyethyl sulfide and methyl iodide in a solution of acetone to stand for 2 days at room temperature. The compound is obtained as a pale yellow oil and may be used in this form for the biological tests.

| Analysis: | C | H | S |
|---|---|---|---|
| Calc. | 30.44 | 6.2 | 11.59 |
| Found | 30.2 | 6.3 | 11.2 |

Other active ingredients may be prepared by analogous methods, for example:

dimethyl-β-chloroethylsulfonium chloride m.p. 143° C. (with decomposition) and dimethyl-β-chloroethylsulfonium bromide m.p. 139° to 140° C. (with decomposition).

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The agents of this invention may reach the plants either through the soil, e.g. in admixture with fertilizers, or through the leaves by spraying. There is also the possibility of the seed being treated.

The biological action of the agents according to this invention is illustrated by the following examples.

EXAMPLE 1

Wheat grains of the "*Heines Koga*" species were sown in sandy loamy soil in Neubauer vessels (i.e. glass dishes with a diameter of 11.5 cm.). Immediately following the sowing, the active ingredients were sprayed at the rate of 12 mg. per vessel on to the surface of the soil in aqueous or methanolic solution. For comparison, in addition to the untreated control vessel, another vessel was treated with 12 mg. of the known active ingredient chlorocholine chloride (CCC). The plants were kept in a greenhouse. After four weeks the following differences in the growth height of the wheat plants were observed:

| Active ingredient (12 mg. per vessel) | Growth height of the wheat plants in cm. | relative |
|---|---|---|
| Control (untreated) | 19.1 | 100 |
| Chlorocholine chloride (CCC) (aqueous solution) | 11.5 | 60 |
| β-Chloroethyldimethylsulfonium iodide (aqueous solution) | 9.3 | 49 |
| β-Hydroxyethyldimethylsulfonium iodide (methanolic solution) | 11.0 | 58 |

The above figures show that the sulfonium compounds reduce the growth height to a greater extent than chlorocholine chloride.

EXAMPLE 2

An experiment was carried out with rye (species *Patkuser summer rye*) under the conditions described in Example 1. It can be seen from the results in the table below that the agents according to the invention had a stronger effect on the growth height of the plants than CCC.

| Active ingredient (12 mg. per vessel) | Growth height of rye plants in cm. | relative |
|---|---|---|
| Control (untreated) | 21.7 | 100 |
| Chlorocholine chloride (CCC) (aqueous solution) | 19.0 | 88 |
| β-Hydroxyethyl-n-butylmethylsulfonium iodide (methanolic solution) | 17.4 | 80 |
| β-Hydroxyethyldimethylsulfonium iodide (methanolic solution) | 17.8 | 82 |
| β-Chloroethyldimethylsufonium iodide (aqueous solution) | 17.5 | 81 |

EXAMPLE 3

A similar experiment was carried out with oats (*Flumingstreue* species) under the conditions described in Examples 1 and 2. The rate, however, was reduced to 3 mg. of active ingredient per vessel.

As can be seen from the results below, even these small quantities were sufficient to have a pronounced effect on the growth height of the oats. Used in these amounts the known active ingredient CCC had no effect on the growth height.

| Active ingredient (3 mg. per vessel) | Growth height of the oats plants in cm. | relative |
|---|---|---|
| Control (untreated) | 22.2 | 100 |
| Chlorocholine chloride (CCC) (aqueous solution) | 22.6 | 102 |
| β-Chloroethylethylmethylsulfonium iodide (methanolic solution) | 19.4 | 87 |
| β-Hydroxyethyl-n-butyl-methylsulfonium iodide (methanolic solution) | 18.9 | 85 |
| β-Hydroxyethyldimethylsulfonium iodide (methanolic solution) | 16.2 | 73 |
| β-Chloroethyldimethylsulfonium iodide (aqueous solution) | 16.1 | 73 |

EXAMPLE 4

Further compounds were tested on wheat (*Opal* species) as follows. Mitscherlich containers were filled with 6 kg. of loamy sandy soil. After the wheat seeds had been sown the surface of the soil was sprayed with the active substances at a rate of 9.4 mg. per container which is equivalent to 3 kg. per hectare. In addition to a control container, the known growth regulator CMH (N,N-di-methyl-N-(β-chloroethyl)-hydrazonium chloride) which reduces the growth height of wheat to a particularly marked degree was used in the test for comparison. One month later the following results were observed.

| Active ingredient (Rate = 3 kg./ha.) | Growth height of wheat cm. | % |
|---|---|---|
| Untreated (control) | 15.5 | 100.0 |
| CMH (N,N-dimethyl-N-(β-chloroethyl)-hydrazonium chloride | 13.7 | 88.4 |
| N-β-chloroethyl-N,N-dimethyl-sulfonium bromide | 13.3 | 85.8 |
| N-β-chloroethyl-N,N-dimethyl-sulfonium chloride | 13.2 | 85.1 |

The following compounds have the same biological action as the sulfonium compounds specified above:
dimethyl-2-chloroethylsulfonium chloride
dimethyl-2-chloroethylsulfonium methyl sulfate
dimethyl-2-bromoethylsulfonium iodide
dimethyl-3-chloropropylsulfonium iodide
dimethyl-3-chloropropylsulfonium chloride
dimethyl-3-chloropropylsulfonium p-tolyl sulfonate
dimethyl-3-hydroxypropylsulfonium iodide
methylpropyl-2-chloroethylsulfonium chloride
diethyl-2-chloroethylsulfonium iodide
diethyl-2-chloroethylsulfonium ethyl sulfate
dimethyl-(2-chloro-2-phenylethyl)-sulfonium iodide
dimethyl-(2-chloro-2-cyanoethyl)-sulfonium iodide
dimethyl-(1-phenyl-2-chloroethyl)-sulfonium chloride
dimethyl-(1-carboxy-2-chloroethyl)-sulfonium bromide
methyl-2-hydroxyethyl-1-butyn-3-yl sulfonium iodide
methylethyl-($\beta,\gamma,\gamma$,-trichloroallyl)-sulfonium iodide
dimethyl-($\gamma,\gamma$-dichloromethallyl)-sulfonium iodide
dimethyl-(1-ethyl-2-chloroethyl)-sulfonium iodide
dimethyl-(2-butyl-2-chloroethyl)-sulfonium chloride
methyl-allyl-2-chloroethylsulfonium iodide
dimethyl-2-chloromethylsulfonium bromide

We claim:
1. A process for retarding the growth of plants which comprises bringing into contact with said plants or seeds thereof a sulfonium compound of the formula

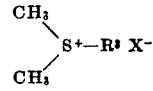

wherein $R^3$ is chloroethyl, bromoethyl, hydroxyethyl, or methylallyl, and X is an anion.

2. A process for retarding the growth of plants which comprises bringing into contact with said plants $\beta$-hydroxyethyl-n-butylmethylsulfonium iodide.

3. A process as claimed in claim 1 wherein said sulfonium compound is $\beta$-hydroxyethyldimethylsulfonium iodide.

4. A process as claimed in claim 1 wherein said sulfonium compound is $\beta$-chloroethyldimethylsulfonium iodide.

5. A process as claimed in claim 1 wherein said plants or seeds thereof and said sulfonium compound are brought into contact by applying said compound to soil containing said plants or seeds.

* * * * *

UNITED STATES PATENT OFFICE
CERTIFICATE OF CORRECTION

Patent No. 3,652,255   Dated March 28, 1972

Inventor(s) Hans Osieka et al

It is certified that error appears in the above-identified patent and that said Letters Patent are hereby corrected as shown below:

First page, left-hand column, seventh line, "burgehof" should read -- burgerhof --.

Column 1, line 9, "trimethylammonium-$\beta$-chloreothyl" should read -- trimethylammonium-$\beta$-chloroethyl --.

Column 2, lines 50 to 52, " 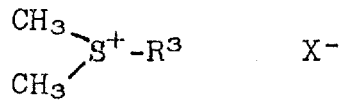 " should read

--

| Analysis | C | H | S | I |
|---|---|---|---|---|
| Calc. | 20.52 | 4.74 | 13.7 | 54.21 |
| Found | 20.6 | 4.8 | 13.7 | 54.3 |

--.

Column 6, lines 19 to 22, "5. A process as claimed in claim 1 wherein said plants or seeds thereof and said sulfonium compound are brought into contact by applying said compound to soil containing said plants or seeds." should read
-- 5. A process for retarding the growth of plants which comprises applying to soil containing seeds of said plants a compound of the formula $$\begin{array}{c} CH_3 \\ \phantom{CH_3} \diagdown \\ \phantom{CH_3} \phantom{CH}S^+ - R^3 \qquad X^- \\ \phantom{CH_3} \diagup \\ CH_3 \end{array}$$

wherein $R^3$ is chloroethyl, bromoethyl, hydroxyethyl, or methylallyl, and X is an anion.

Column 6, claim 1, line 2, cancel "of seeds thereof".

Signed and sealed this 26th day of December 1972.

(SEAL)
Attest:

EDWARD M. FLETCHER, JR.
Attesting Officer

ROBERT GOTTSCHALK
Commissioner of Patents